United States Patent
Takemoto et al.

(10) Patent No.: US 7,835,053 B2
(45) Date of Patent: Nov. 16, 2010

(54) PROJECTION IMAGE DISPLAY APPARATUS

(75) Inventors: Seiji Takemoto, Daito (JP); Yutaka Takahashi, Daito (JP); Hiroshi Nishigaki, Daito (JP); Kenji Nagashima, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 12/408,305

(22) Filed: Mar. 20, 2009

(65) Prior Publication Data

US 2009/0244673 A1 Oct. 1, 2009

(30) Foreign Application Priority Data

Mar. 28, 2008 (JP) .............................. 2008-087635

(51) Int. Cl.
*G02B 26/08* (2006.01)
(52) U.S. Cl. ............... 359/207.7; 359/207.1; 359/215.1
(58) Field of Classification Search ... 359/206.1–207.6, 359/215.1, 224.1–224.2, 662
See application file for complete search history.

(56) References Cited

U.S. PATENT DOCUMENTS 6,980,367 B2 * 12/2005 Yamamoto ................. 359/662

| 2007/0176084 A1 | 8/2007 | Shyu et al. |
| 2008/0143979 A1 | 6/2008 | Konno |

FOREIGN PATENT DOCUMENTS

| DE | 10 2004 063 554 A1 | 7/2006 |
| EP | 1 566 972 A2 | 8/2005 |
| JP | 2001-281583 A | 10/2001 |
| JP | 2004-279644 | 10/2004 |
| WO | WO 2009/003510 A1 | 1/2009 |

OTHER PUBLICATIONS

European Search Report dated Jun. 26, 2009 (six (6) pages).

* cited by examiner

*Primary Examiner*—James Phan
(74) *Attorney, Agent, or Firm*—Crowell & Moring LLP

(57) ABSTRACT

Disclosed is a projection image display apparatus to display an image by projecting a light from a light source to a screen including a scan mirror to scan the light from the light source by vibrating in a sine vibration manner at least in an one-dimensional direction and a correction lens which is disposed between the scan mirror and the screen and which corrects a deflection angle of the light scanned by the scan mirror at least in the one-dimensional direction, and the correction lens carries out a correction so that the larger a scan angle of the scan mirror is, the larger the deflection angle is to be by the correction.

3 Claims, 5 Drawing Sheets

PROJECTION IMAGE DISPLAY APPARATUS

BACKGROUND OF THE INVENTION

1. Field of the Invention

The present invention relates to a projection image display apparatus using a scan mirror which vibrates in a sine vibration manner.

2. Description of Related Art

Conventionally, there is known a projection image display apparatus using a resonant scan mirror as a projection image display apparatus such as a projector or the like. When the scan mirror is made to vibrate by a sine wave alternating current, the scan rate of the mirror is sinusoidally changed with respect to time.

FIG. 4 shows a relation between scan angle and scan rate of the scan mirror which vibrates in the sine vibration manner. As shown in FIG. 4, the scan rate of the scan mirror reaches maximum at the center of an image where the scan angle (vibration amplitude) is zero and the scan rate of the scan mirror is zero at the edges of the image where the scan angles are maximum values of X and −X in horizontal direction (or, maximum values of Y, −Y in vertical direction). Therefore, scan width per time unit is not constant, and the scan width becomes smaller as approaching the edges of the image. Because the speed of the scan mirror is not constant, problems such that the image to be projected on the screen is distorted and that the brightness of the image is uneven occur.

In view of the above problems, in JP2004-279544, there is suggested an image display apparatus which corrects the equally spaced characteristic of line images in the scanning direction which occurs because of the deflection unit and the scan lens system, that is, an image display apparatus which carries out correction for spaces between each line images on a screen by changing the time interval of pixel clock for each pixel line unit. For example, the pixel clock having a time interval which is longer than the regular clock is mixed in the pixel clock corresponding to the periphery blocks among the blocks in which the scanning area is divided. Thereby, the equally spaced characteristic is to be corrected.

However, the technology for correcting the equally spaced characteristic disclosed in JP2004-279544 is carried out by controlling the time interval of the image clock, and there is a problem that the structure will be complicated because electrical control is needed.

SUMMARY OF THE INVENTION

It is, therefore, a main object of the present invention is to correct the distortion of the image due to the speed of the scan mirror not being constant in more simple structure in the projection image display apparatus which displays an image by scanning the light from the light source by the scan mirror.

According to a first aspect of the present invention, there is provided a projection image display apparatus to display an image by projecting a light from a light source to a screen comprising a scan mirror to scan the light from the light source by vibrating in a sine vibration manner at least in an one-dimensional direction and a correction lens which is disposed between the scan mirror and the screen and which corrects a deflection angle of the light scanned by the scan mirror at least in the one-dimensional direction, and the correction lens carries out a correction so that the larger a scan angle of the scan mirror is, the larger the deflection angle is to be by the correction.

According to a second aspect of the present invention, there is provided a projection image display apparatus to display an image by projection a light from a light source to a screen comprising a scan mirror to scan the light from the light source by vibrating in a sine vibration manner in a two-dimensional direction and a correction lens which is disposed between the scan mirror and the screen and which corrects a deflection angle of the light scanned by the scan mirror in the two-dimensional direction, and the correction lens includes a toric lens and carries out a correction so that the larger a scan angle of the scan mirror is, the larger the deflection angle is to be by the correction.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, the embodiment of the present invention will be described with reference to the drawings.

In the embodiment, a description will be given by exemplifying a laser projector using a laser beam (light) as a projection image display apparatus, for example.

Figure 1:
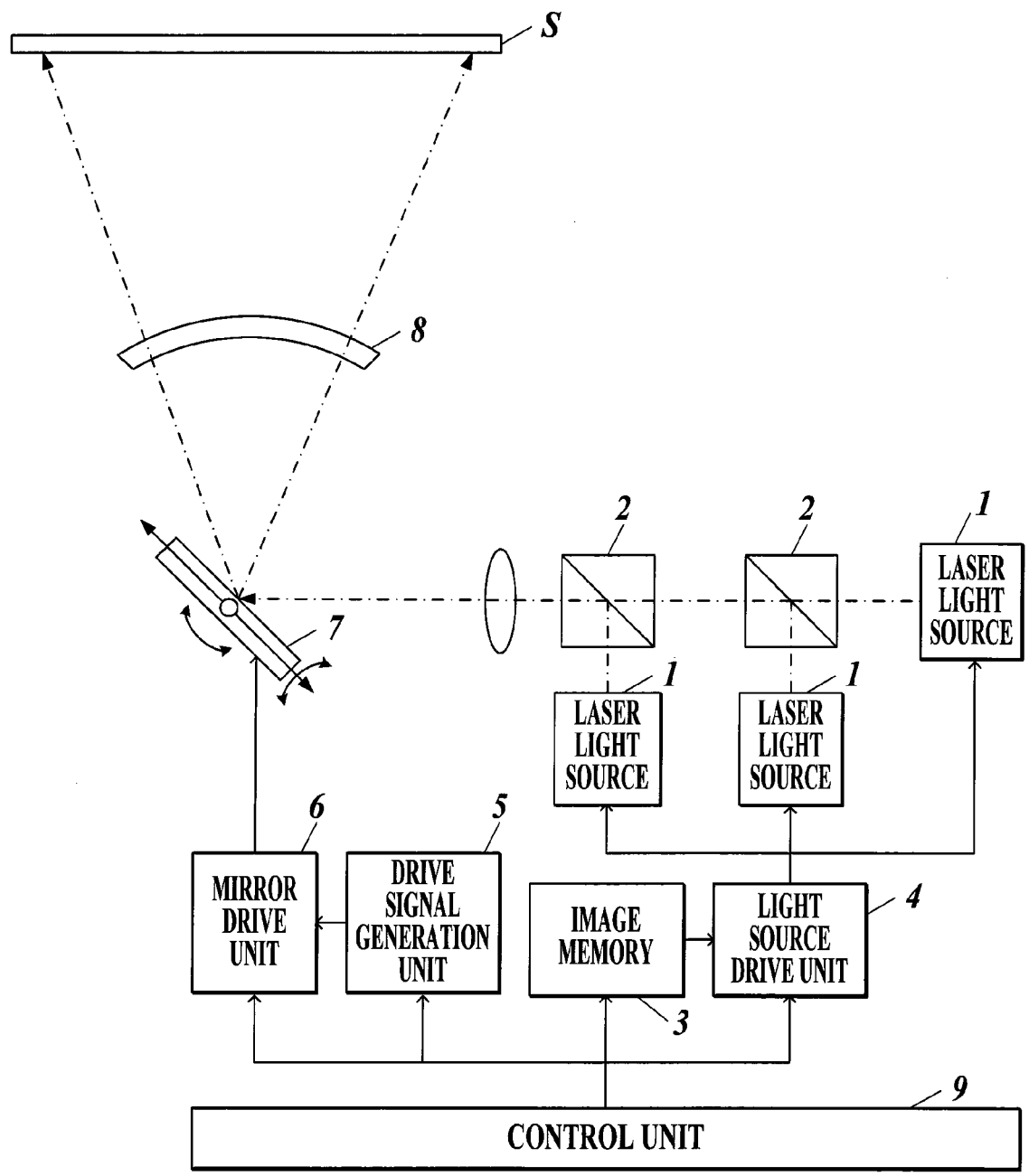
FIG. 1 is a block diagram showing a main structure of a laser projector of the embodiment.
Figure 2:
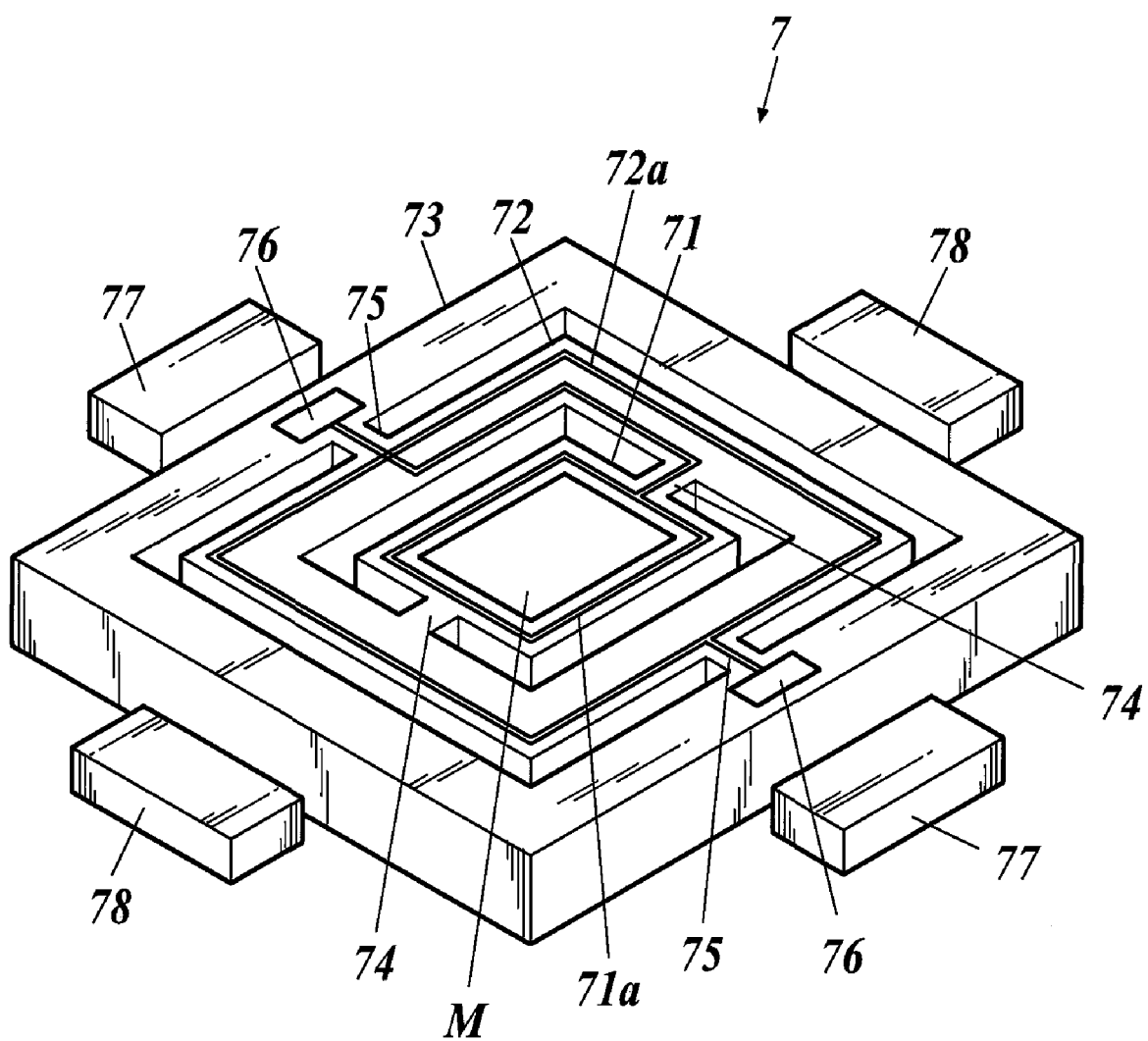
FIG. 2 is a schematic view showing a main structure of a scan mirror.
Figure 3:
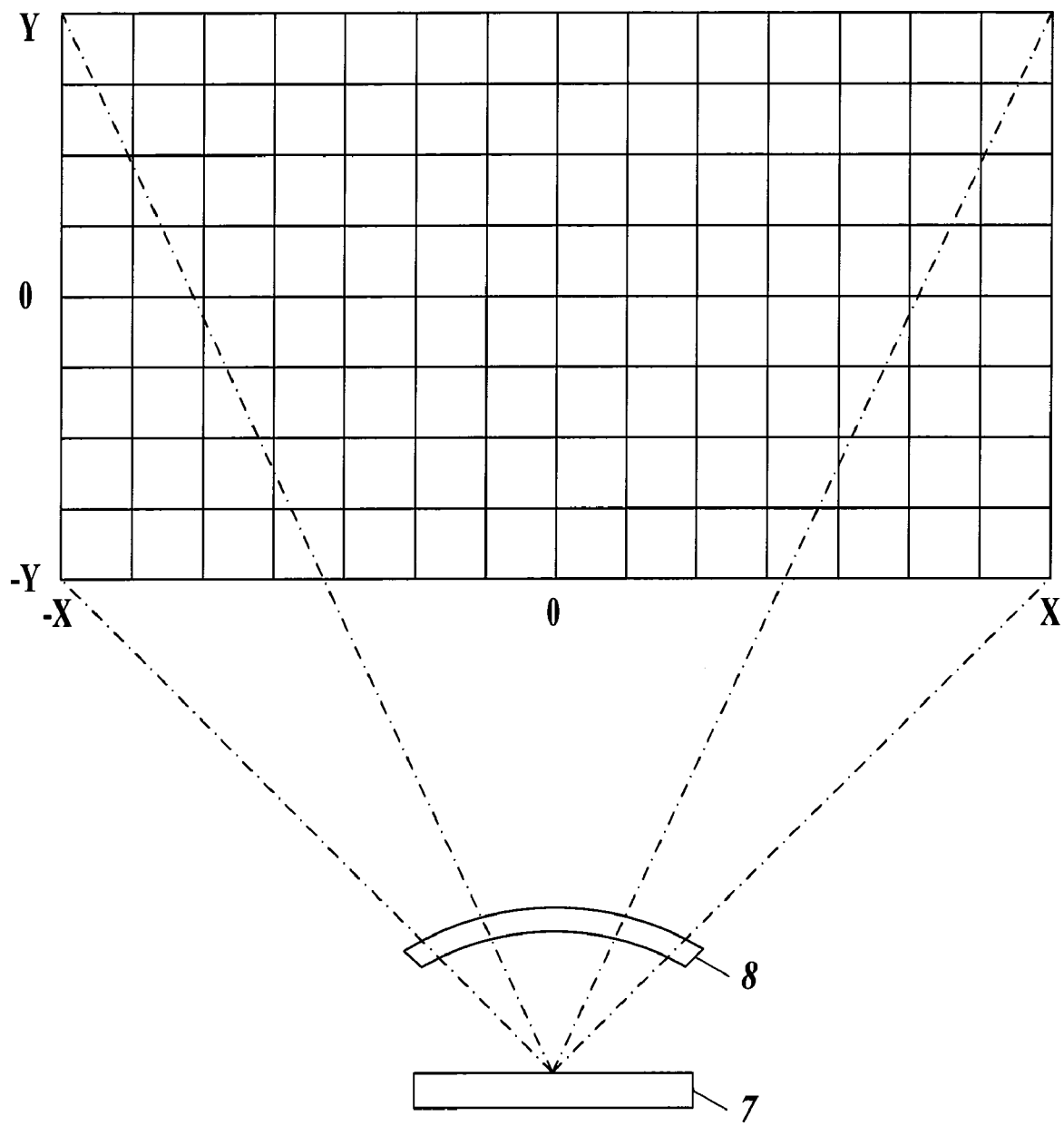
FIG. 3 is a diagram for explaining an image which is to be displayed by the laser projector of the embodiment.

FIG. 1 is a block diagram showing a main structure of a laser projector of the embodiment. FIG. 2 is a schematic view showing a main structure of a scan mirror. FIG. 3 is a diagram for explaining an image which is to be displayed by the laser projector of the embodiment. Here, the scope of the invention is not limited to the examples shown in the drawings.

As shown in FIG. 1, a laser projector (projection image display apparatus) 100 of the embodiment comprises light sources 1 which emit laser beams (lights), a mirror unit 2 to multiplex the laser beams emitted from the light sources 1, an image memory 3 to store image data of an image to be displayed on a screen S, a light source drive unit 4 to drive the light sources 1 based on the image data, a drive signal generation unit 5 to generate a sine wave alternating current signal of a predetermined frequency, a mirror drive unit 6 to drive the scan mirror 7 based on the sine wave alternating current signal which is generation in the drive signal generation unit 5, the scan mirror 7 which is driven by the mirror drive unit 6 to scan the laser beam emitted from the light sources 1 in two-dimensional direction, a correction lens 8 which is disposed between the scan mirror 7 and the screen S, a control unit 9 to integrally control the operation of the laser projector 100 and the like.

For example, the light sources 1 are the semiconductor lasers (LD: Laser Diode), and the light sources 1 modulate the image data from the image memory 3 and emit the laser beams of each color of red (R), green (G) and blue (B), respectively, by the drive of the light source drive unit 4.

For example, the mirror unit 2 is the dichroic mirror which transmits the light having a specific wave length and which reflects the light having wave length other than the specific wave length or the like, and the mirror unit 2 multiplexes the laser beams of each color emitted from a plurality of light sources 1 to a laser beam having light axis of single axis.

The image memory 3 stores image data of an image to be displayed on the screen S. Here, the supply source of image data is not limited to this, and image data stored in various types of storage devices such as a PC (Personal Computer) connected to a case, a video camera or the like may be used.

The light source drive unit 4 drives the light sources 1 to adjust the laser beams for each pixel based on image data read from the image memory 3.

The drive signal generation unit 5 generates the sine wave alternating current signal of innate resonance frequency of the scan mirror 7 in response to the control by the control unit 9.

The mirror drive unit 6 is connected to the electrodes (aftermentioned) 76 of the scan mirror 7 and vibrates the scan mirror 7 in the sine vibration manner by supplying the sine wave alternating current signal generated in the drive signal generation unit 5 to the electrodes 76.

The scan mirror 7 reflects the laser beam from the light sources 1 in two-dimensional direction to project the image on the screen S. In the embodiment, an electromagnetic-driven MEMS mirror which applies the MEMS (Micro Electro Mechanical System) technology is used, for example, as the scan mirror 7 that carries out the two-dimensional scanning. The MEMS mirror is a micro device which is manufactured by accumulating mechanical mechanism and electric circuit on a silicon wafer by using the micro machining technology, and the entire apparatus can be made smaller by using the MEMS mirror.

As shown in FIG. 2, the scan mirror 7 comprises a mirror substrate 71 to reflect the laser beam, an inner frame 72 formed so as to enclose the mirror substrate 71 and an outer frame 73 formed so as to enclose the inner frame 72. The mirror substrate 71 is supported at inner side of the inner frame 72 by the inner hinges 74 and can swing about the axis of the inner hinges 74. Further, the inner frame 72 is supported at inner side of the outer frame 73 by the outer hinges 75 in a direction orthogonal to the inner hinges 74 and can swing about the axis of the outer hinges 75.

A mirror M is provided at approximately center of the surface of the mirror substrate 71, and a plan coil 71*a* is formed at the periphery of the mirror M so as to enclose the mirror M. Further, a plan coil 72*a* is formed at the periphery of the surface of the inner frame 72, and both ends of each of the coils 71*a*, 72*a* are electrically connected to the electrodes 76. Moreover, a pair of permanent magnets 77 and a pair of permanent magnets 78 are disposed at sides of the outer frame 73 so that the north pole of the magnet and the south pole of the magnet face each other in each pair.

When electric current is applied to the coil 71*a* in the above scan mirror M7, the Lorentz force is generated by the interaction with the magnetic field which is generated by the permanent magnets 77 and the mirror substrate 71 inclines to the position where the mirror substrate 71 is balanced with the resilience of the inner hinges 74, the inner hinges 74 acting as an axis. Further, when electric current is applied to the coil 72*a*, the Lorentz force is generated by the interaction with the magnetic field which is generated by the permanent magnets 78 and the inner frame 72 inclines to the position where the inner frame 72 is balances with the resilience of the outer hinges 75, the outer hinges 75 acting as an axis.

When the sine wave alternating current of innate resonance frequency of the scan mirror 7 is applied to the coils 71*a*, 72*a* of the scan mirror 7, the scan mirror 7 vibrates in the resonant vibration manner in two directions (horizontal direction and vertical direction) orthogonal to the axis of the inner hinges 74 and the outer hinges 75. During the resonant vibration, the scan mirror 7 moves sinusoidally, and the scan width per unit time will be broader as approaching the center portion of the image where the scan angle is smaller and will be narrower as approaching the edges of the image where the scan angles are larger.

Figure 4:
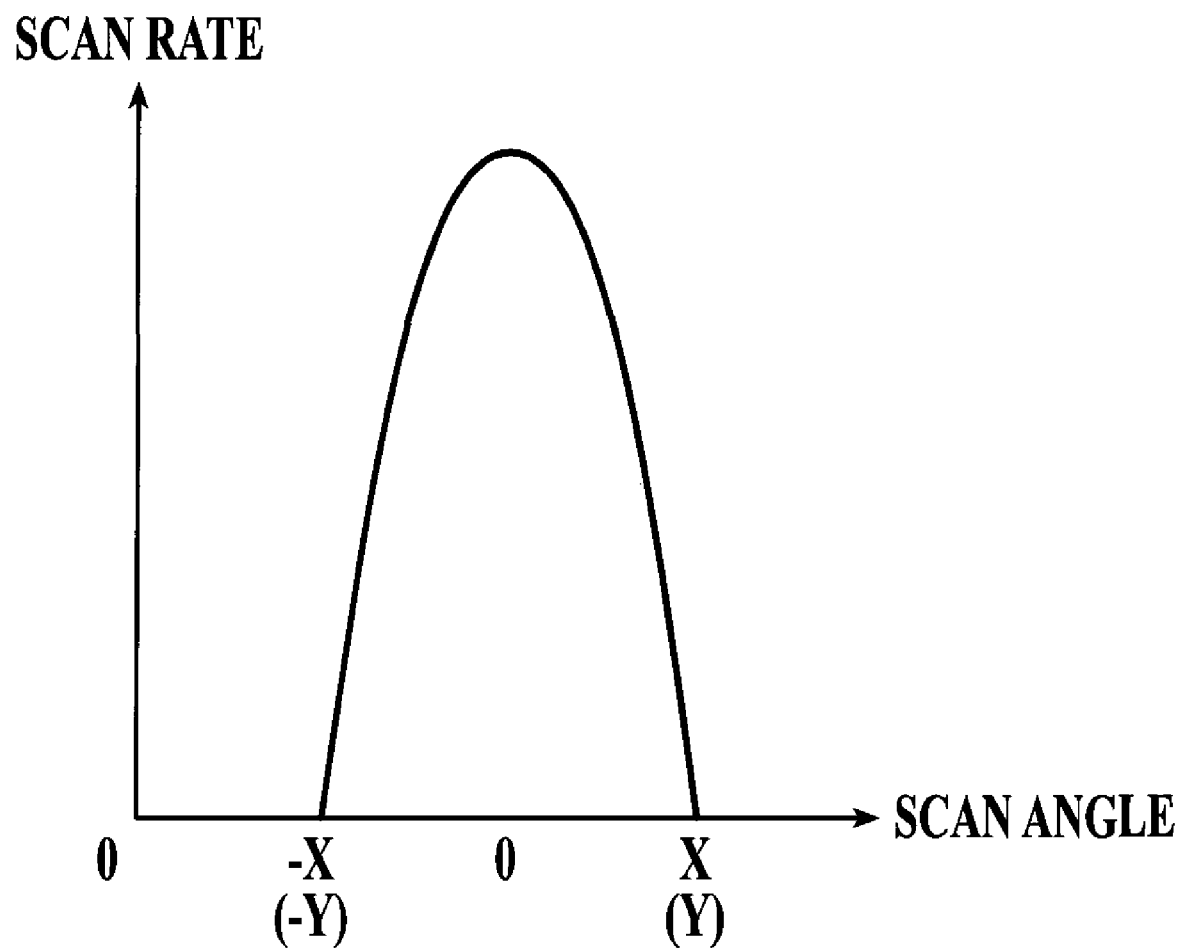
FIG. 4 is a diagram showing a relation between scan rate and scan angle of the scan mirror which vibrates in a sine vibration manner.
Figure 5:
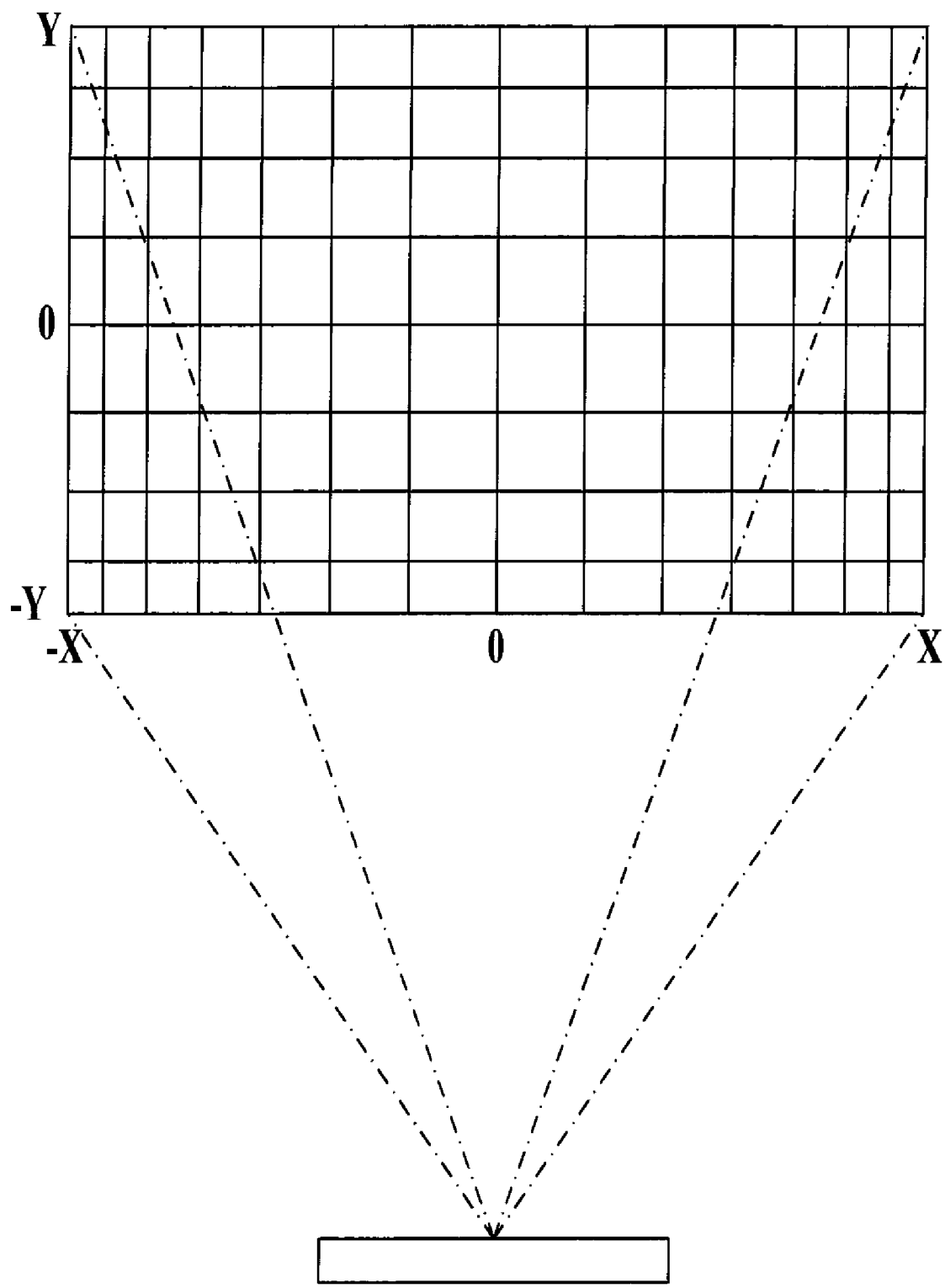
FIG. 5 is a diagram for explaining an image which is to be displayed by a conventional projection image display apparatus.

The correction lens 8 is disposed between the scan mirror 7 and the screen S, and corrects the distortion of the image and the bias of brightness that occur due to speed change in the above described scan mirror 7 by correcting the deflection angle of the light scanned by the scan mirror 7 in two-dimensional direction. The larger the scan angle of the scan mirror 7 is, the larger the deflection angle is to be by the correction by the correction lens 8. That is, the correction lens 8 carries out the correction in a direction so as to broaden the light path of the light from the scan mirror 7 as the light approaches the edges of the image where the scan angles become larger. Therefore, as shown in FIG. 4, the scan width per time unit will be constant in the entire screen and the laser beam from the scan mirror 7 can scan the screen S in a constant speed.

As for the correction lens 8 having the above characteristic, the toric lens is applied, for example. The light which entered the toric lens proceeds by being refracted in a direction so as to diffuse with respect to the two-dimensional direction. Further, the arcsine lens having the arcsine (arc-sin) characteristic shown by $1 = f \sin^{-1} \theta$ (here, 1:scan distance, f:focus distance, $\theta$:incidence angle) is preferable.

Moreover, when the scan mirror 7 is vibrated in the sine vibration manner only in one-dimensional direction, a concave cylindrical lens is used, for example, as the correction lens 8 to correct the deflection angle of the light only in one-dimensional direction. The light which entered the cylindrical lens proceeds straight without being refracted with respect to the one-dimensional direction and will proceed by being refracted in a direction so as to diffuse with respect to the one-dimensional direction.

According to the above described laser projector (projection image display apparatus) 100 of the present embodiment, the laser projector 100 comprises the scan mirror 7 so scan the light from the light sources 1 by vibrating in the sine vibration manner in the two-dimensional direction and the correction lens 8 which is disposed between the scan mirror 7 and the screen S and which corrects the deflection angle of the light scanned by the scan mirror 7 in the two-dimensional direction, and the toric lens is included in the correction lens 8 and the larger the scan angle of the scan mirror 7 is, the larger the deflection angle is to be by the correction.

That is, by disposing the correction lens 8 which corrects the deflection angle of the light between the scan mirror 7 and the screen S, distortion of the image and unevenness of brightness which occur due to the scan mirror 7 vibrates sinusoidally are to be corrected. Therefore, in the projection image display apparatus in which an image is displayed by scanning the light from the light sources 1 by the scan mirror 7, distortion of the image due to the speed of the scan mirror 7 being not constant can be corrected in more simple structure.

Here, the present invention is not limited to the scope of the above embodiment, and various modifications and changes in design can be carried out within the scope of the present invention.

For example, a detection unit to detect the displacement of rotation angle of the scan mirror, a detection unit to detect the radiation position of the laser beam on the screen S or the like may be provided. Highly accurate angle control can be carried out by feeding back the detection signal from such detection unit to the drive unit of the scan mirror.

Moreover, types of the correction lens 8 is not limited to the examples shown in the above embodiment, and any lens can be used as long as the lens can make the light refract in the direction so as to broaden the light with respect to the scan mirror 7 in which the sine vibration is carried out. Further, number of the correction lens 8 is also not limited to one, and a plurality of lenses can be combined to be used.

According to a first aspect of the preferred embodiment of the present invention, there is provided a projection image display apparatus to display an image by projecting a light from a light source to a screen comprising a scan mirror to scan the light from the light source by vibrating in a sine vibration manner at least in an one-dimensional direction and a correction lens which is disposed between the scan mirror and the screen and which corrects a deflection angle of the light scanned by the scan mirror at least in the one-dimensional direction, and the correction lens carries out a correction so that the larger a scan angle of the scan mirror is, the larger the deflection angle is to be by the correction.

Preferably, the correction lens includes a concave cylindrical lens.

Preferably, the scan mirror is a scan mirror which vibrates in the sine vibration manner in a two-dimensional direction and the correction lens includes a toric lens.

According to a second aspect of the preferred embodiment of the present invention, there is provided a projection image display apparatus to display an image by projection a light from a light source to a screen comprising a scan mirror to scan the light from the light source by vibrating in a sine vibration manner in a two-dimensional direction and a correction lens which is disposed between the scan mirror and the screen and which corrects a deflection angle of the light scanned by the scan mirror in the two-dimensional direction, and the correction lens includes a toric lens and carries out a correction so that the larger a scan angle of the scan mirror is, the larger the deflection angle is to be by the correction.

According to the present invention, the projection image display apparatus comprises the scan mirror to scan the light from the light sources by vibrating in the sine vibration manner in at least one-dimensional direction and the correction lens which is disposed between the scan mirror and the screen and which corrects the deflection angle of the light scanned by the scan mirror in at least one-dimensional direction, and the correction lens carries out the correction so that the larger the scan angle of the scan mirror is, the larger the deflection angle is to be by the correction.

That is, by disposing the correction lens which corrects the deflection angle of the light between the scan mirror and the screen, distortion of the image and unevenness of brightness which occur due to the scan mirror vibrates sinusoidally are to be corrected. Therefore, in the projection image display apparatus in which an image is displayed by scanning the light from the light sources by the scan mirror, distortion of the image due to the speed of the scan mirror being not constant can be corrected in more simple structure.

The entire disclosure of Japanese Patent Application No. 2008-087635 filed on Mar. 28, 2008 including description, claims drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A projection image display apparatus to display an image by projecting a light from a light source to a screen, comprising:
   a scan mirror to scan the light from the light source by vibrating in a sine vibration manner at least in an one-dimensional direction; and
   a correction lens which is disposed between the scan mirror and the screen and which corrects a deflection angle of the light scanned by the scan mirror at least in the one-dimensional direction,
   wherein the correction lens carries out a correction so that the larger a scan angle of the scan mirror is, the larger the deflection angle is to be by the correction, and
   wherein the correction lens includes a concave cylindrical lens.

2. A projection image display apparatus to display an image by projecting a light from a light source to a screen, comprising:
   a scan mirror to scan the light from the light source by vibrating in a sine vibration manner at least in an one-dimensional direction; and
   a correction lens which is disposed between the scan mirror and the screen and which corrects a deflection angle of the light scanned by the scan mirror at least in the one-dimensional direction,
   wherein the correction lens carries out a correction so that the larger a scan angle of the scan mirror is, the larger the deflection angle is to be by the correction,
   wherein the scan mirror is a scan mirror which vibrates in the sine vibration manner in a two-dimensional direction, and
   wherein the correction lens includes a toric lens.

3. A projection image display apparatus to display an image by projection a light from a light source to a screen, comprising:
   a scan mirror to scan the light from the light source by vibrating in a sine vibration manner in a two-dimensional direction; and
   a correction lens which is disposed between the scan mirror and the screen and which corrects a deflection angle of the light scanned by the scan mirror in the two-dimensional direction,
   wherein the correction lens includes a toric lens and carries out a correction so that the larger a scan angle of the scan mirror is, the larger the deflection angle is to be by the correction.

* * * * *